(12) United States Patent
Chan

(10) Patent No.: US 7,487,982 B2
(45) Date of Patent: Feb. 10, 2009

(54) COMBINATION VEHICLE FRAME

(75) Inventor: Kun-Do Chan, Tainan (TW)

(73) Assignee: J.D. Components Co., Ltd., Chang Hua Hsien (TW)

( * ) Notice: Subject to any disclaimer, the term of this patent is extended or adjusted under 35 U.S.C. 154(b) by 612 days.

(21) Appl. No.: 11/119,821

(22) Filed: May 3, 2005

(65) Prior Publication Data

US 2006/0186641 A1    Aug. 24, 2006

(30) Foreign Application Priority Data

Feb. 18, 2005    (TW) .............................. 94104945 A

(51) Int. Cl.
*B62M 1/00*    (2006.01)
(52) U.S. Cl. .............................. 280/87.01; 280/87.041; 280/62; 280/259; 280/282; 280/249; 280/287
(58) Field of Classification Search ............. 280/87.01, 280/62, 259, 282, 249, 287
See application file for complete search history.

(56) References Cited

U.S. PATENT DOCUMENTS

| | | | | |
|---|---|---|---|---|
| 2,937,035 A * | 5/1960 | Moll | ......................... | 280/282 |
| 3,039,791 A * | 6/1962 | Horowitz et al. | ............ | 280/259 |
| 6,095,543 A * | 8/2000 | McMahon et al. | .......... | 280/282 |
| 6,601,862 B2 * | 8/2003 | Kettler | ....................... | 280/231 |
| 6,666,470 B2 * | 12/2003 | Li | .............................. | 280/282 |
| 2002/0084620 A1 * | 7/2002 | Yu et al. | ..................... | 280/283 |
| 2004/0164515 A1 * | 8/2004 | Gunter et al. | ............... | 280/293 |

FOREIGN PATENT DOCUMENTS

DE       426912 C  *  3/1926
WO    WO 2004067352 A1  *  8/2004

* cited by examiner

*Primary Examiner*—Christopher P Ellis
*Assistant Examiner*—Jacob Meyer
(74) *Attorney, Agent, or Firm*—Browdy and Neimark, P.L.L.C.

(57) ABSTRACT

A combination vehicle frame includes a base frame unit formed of a plurality of frame bars detachably connected to one another. One of the frame bars is provided with a head having intersected first through hole and second through hole. A rear wheel frame unit is detachably connected to the base frame unit remote from the head. A front wheel frame unit is selectively inserted through one of the first through hole and second through hole of the base frame unit.

18 Claims, 5 Drawing Sheets

COMBINATION VEHICLE FRAME

BACKGROUND OF THE INVENTION

1. Field of the Invention

The present invention relates to vehicle frame and more particularly, to a combination vehicle frame.

2. Description of the Related Art

Various vehicles such as tricycles, bicycles, kick scooters, and etc. are commercially available for use as transportable vehicle means and/or sports means. A baby tricycle is a small vehicle for propelling by a child sitting on it. A kick scooter is a wheeled device that is movable on the floor when the user stands with one leg on it and kicks with the other leg against the floor.

The aforesaid various vehicles (carriers) are designed for different purposes. Consumers may have to spend a lot of money to purchase different vehicles (carriers) for different purposes. Further, these conventional vehicles (carriers) are commonly well assembled in factory for ready use, not allow the consumers to enjoy the function of do-it-yourself.

SUMMARY OF THE INVENTION

The present invention has been accomplished under the circumstances in view. It is the main object of the present invention to provide a combination vehicle frame, which allow the user to change the structure subject to different requirements and, enables the user to enjoy the fun of assemble the combination vehicle frame by oneself.

To achieve this object of the present invention, the combination vehicle frame comprises a base frame unit formed of a plurality of frame bars detachably connected to one another. One of the frame bars is provided with a head having a first through hole and a second through hole intersecting the first through hole. A rear wheel frame unit is detachably connected to the base frame unit remote from the head. A front wheel frame unit is selectively inserted through one of the first through hole or second through hole of the base frame unit.

DETAILED DESCRIPTION OF THE INVENTION

Referring to FIGS. 1-4, a combination vehicle frame 10 is assembled as a tricycle, comprising a base frame unit 20, a rear wheel frame unit 50, and a front wheel frame unit 60.

Figure 1:
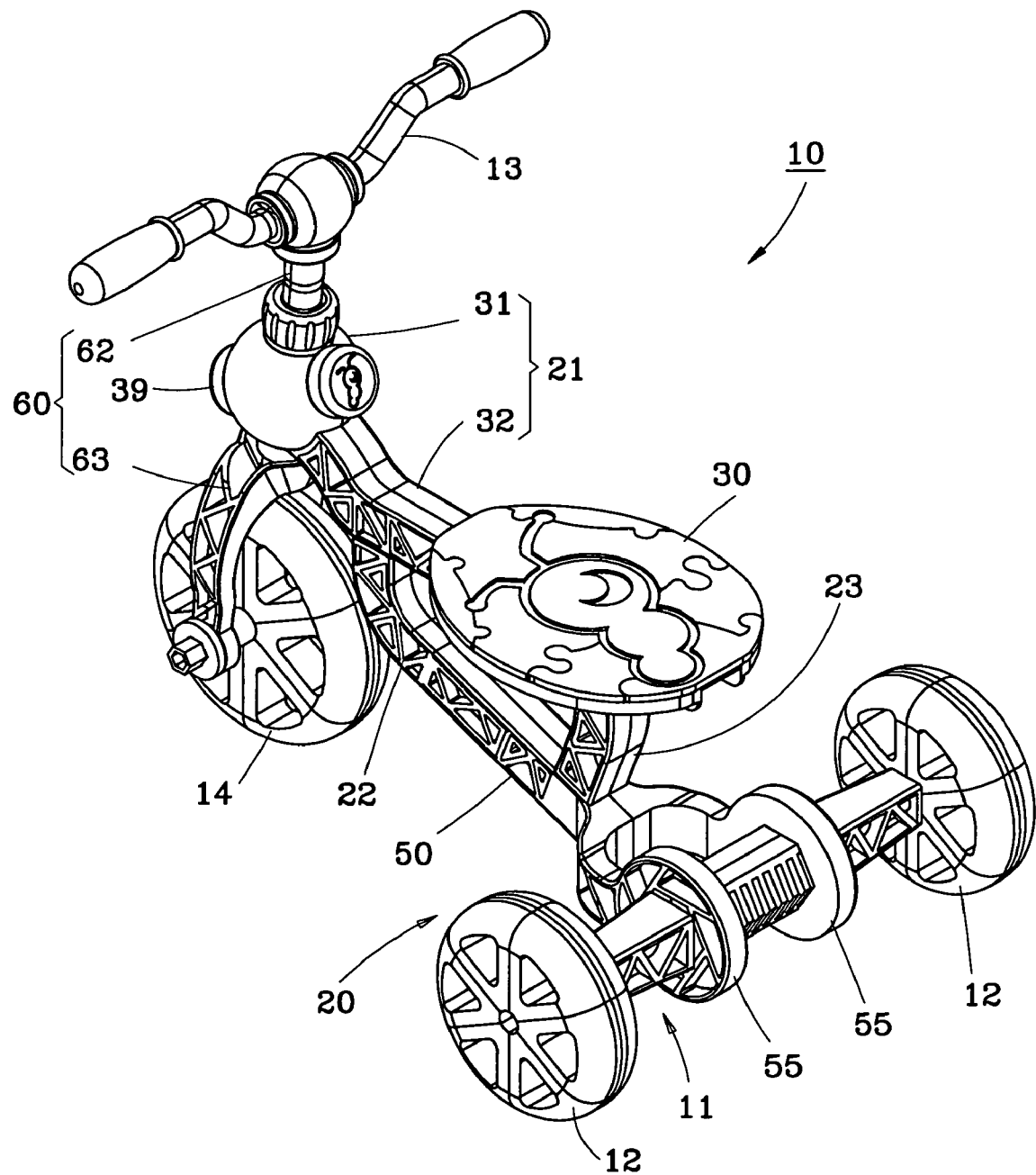
FIG. 1 is a perspective view of a combination vehicle frame for tricycle according to the present invention.
Figure 2:
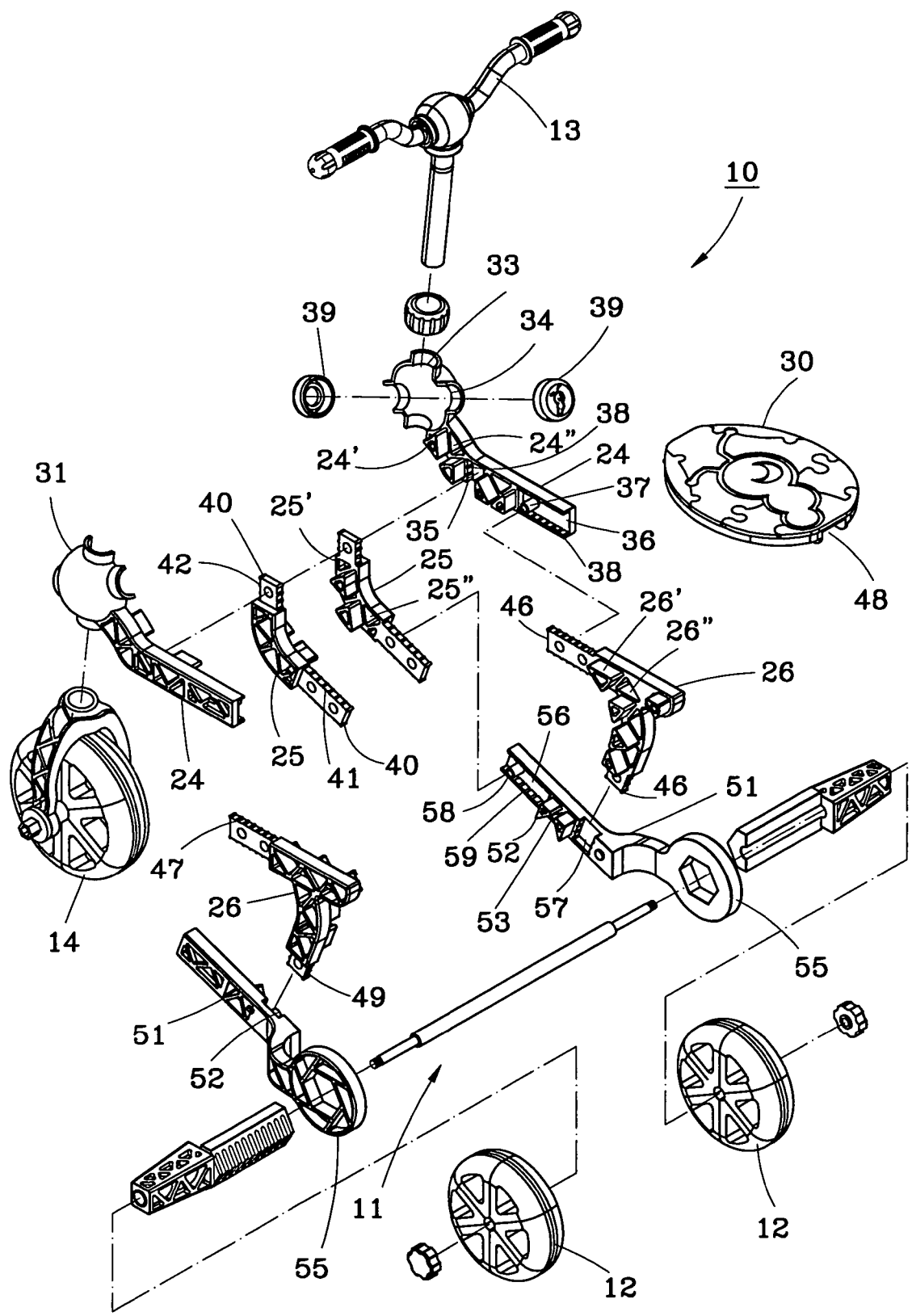
FIG. 2 is an exploded view of the combination vehicle frame according to the present invention.
Figure 3:
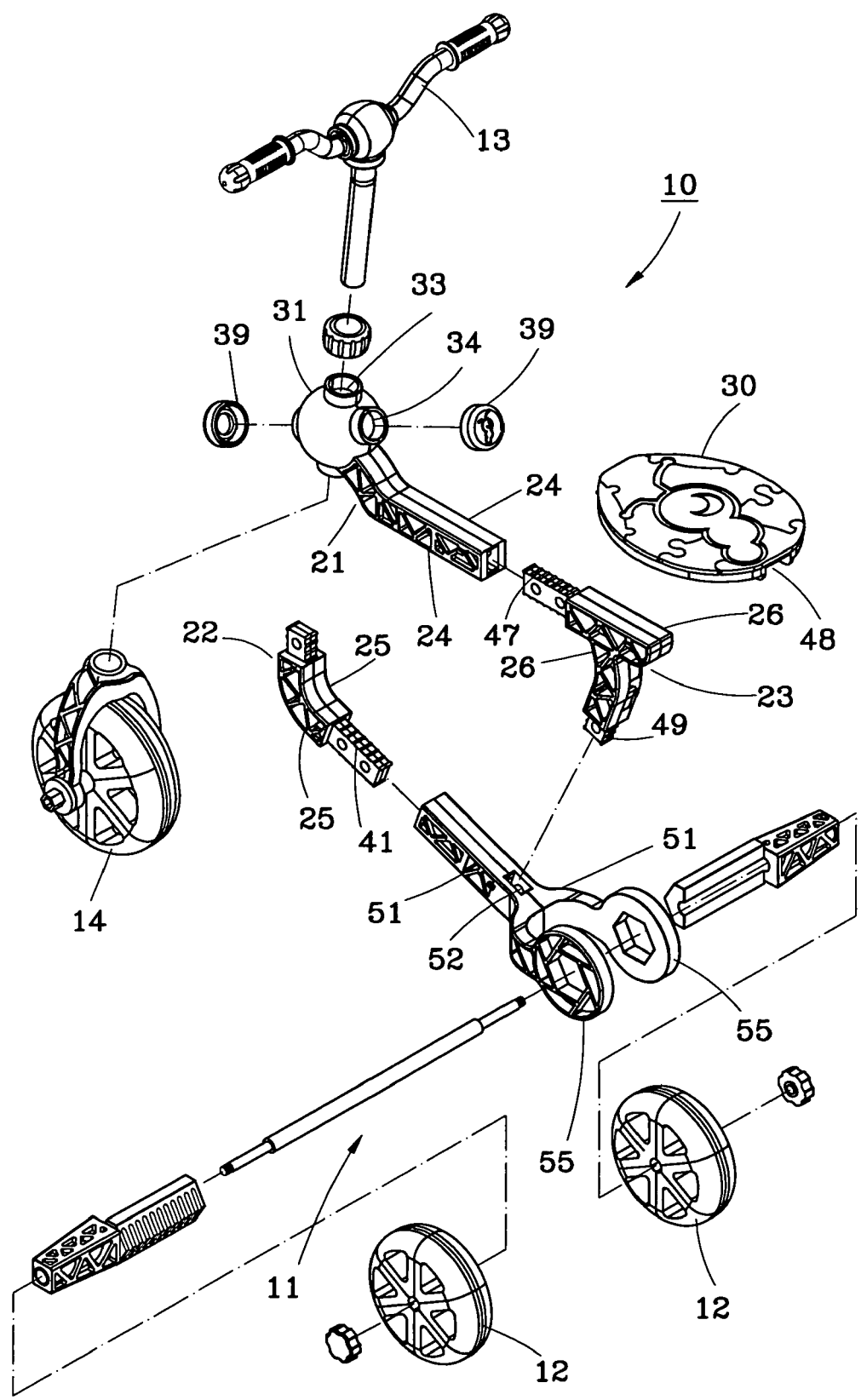
FIG. 3 is another exploded view of the combination vehicle frame according to the present invention.

As shown in FIGS. 2 and 3, the base frame unit 20 comprises a first frame bar 21, a second frame bar 22, a third frame bar 23, and a seat frame 30. The first frame bar 21 is comprised of two symmetrical half shells 24. The second frame bar 22 is comprised of two symmetrical half shells 25. The third frame bar 23 is comprised of two symmetrical half shells 26. The half shells 24-26 of the frame bars 21-23 each have a plurality of triangular plug rods 24'-26' and triangular plug holes 24"-26". By means of engaging respective triangular plug rods 24'-26' into respective triangular plug holes 24"-26", the respective half shells 24-26 of the frame bars 21-23 are respective fastened together.

The first frame bar 21 has a spherical head 31 and a support body 32 extending from the spherical head 31. The spherical head 31 has a first through hole 33 and a second through hole 34. The through holes 33,34 intersect each other, and define with the longitudinal axis of the support body 32 a respective contained angle. The support body 32 has a front locating hole 35, a rear locating hole 36, two locating rods 37 respectively disposed inside the front locating hole 35 and the rear locating hole 36 (the locating rod in the front locating hole 35 is not shown), and a series of locating grooves 38, 38' respectively disposed inside the locating holes 35, 36. Two caps 39 are installed in the spherical head 31 to selectively close the two ends of the first through hole 33 or second through hole 34.

The second frame bar 22 is smoothly arched, having two flat plug rods 40, 40' respectively extended from the front and rear sides thereof. The flat plug rods 40, 40' each have a series of teeth 41, 41' and at least one through hole 42, 42'. The third frame bar 23 has a straight portion 43, a curved portion 45 formed integral and extending from the rear side of the straight portion 43, and two flat plug rods 46, 46' respectively extending from the front side of the straight portion 43 and the rear (bottom) side of the curved portion 43. The flat plug rods 46, 46' each have a series of teeth 47, 47' and at least one through hole 49, 49'. The seat frame 30 is an oval plate frame, having a bottom mounting groove 48.

The rear wheel frame unit 50 is comprised of two symmetrical half shells 51. The half shells 51 each have a plurality of triangular plug rods 52 and triangular plug holes 53. By plugging the respective plug rods 52 of one of the half shells 51 into the respective plug holes 53 of the other of the half shells 51, the two half shells 51 are fastened together. The rear wheel frame unit 50 has a front extension portion 54 forwardly extending from the front side thereof, two rear coupling rings 55 arranged in parallel at the rear side thereof, a first locating hole 56 and a second locating hole 57 respectively formed in the front extension portion 54, two locating rods 58, 58' respectively disposed in the locating holes 56, 57, and series of locating grooves 59, 59' respectively disposed inside the locating holes 56, 57. Further, a wheel axle assembly 11 is fastened to the two rear coupling rings 55 of the rear wheel frame unit 50 to support two rear wheels 12 at the two ends thereof.

The front wheel frame unit 60 comprises a head tube 61, which holds a handlebar 13, and a front fork 63, which supports a front wheel 14 at the bottom side of the head tube 61. The head tube 61 is selectively insertable through the first through hole 23 or second through hole 24 of the spherical head 31 of the first frame bar 21 of the base frame unit 20.

The assembly process of the combination vehicle frame 10 is outlined hereinafter with reference to FIGS. 2-4 again. The front flat plug rod 40 of the second frame bar 22 is inserted into the front locating hole 35 of the first frame bar 21 to couple the through hole 42 of the front flat plug rod 40 to the locating rod (not shown) in the front locating hole 35 and to force the teeth 41 into engagement with the locating grooves 38, and then the plug rod 46 of the straight portion 43 of the third frame bar 23 is inserted into the rear locating hole 36 of the first frame bar 21 to couple the through hole 49 of the plug rod 46 to the locating rod 37 in the rear locating hole 36 and to force the teeth 47 into engagement with the locating grooves 38', and then the seat 30 is fastened to the third frame bar 23 by forcing the mounting groove 48 into engagement with the straight portion 43 of the third frame bar 23. Therefore, the first frame bar 21, the second frame bar 22, the third frame bar 23 and the seat 30 are detachably fastened together.

Figure 4:
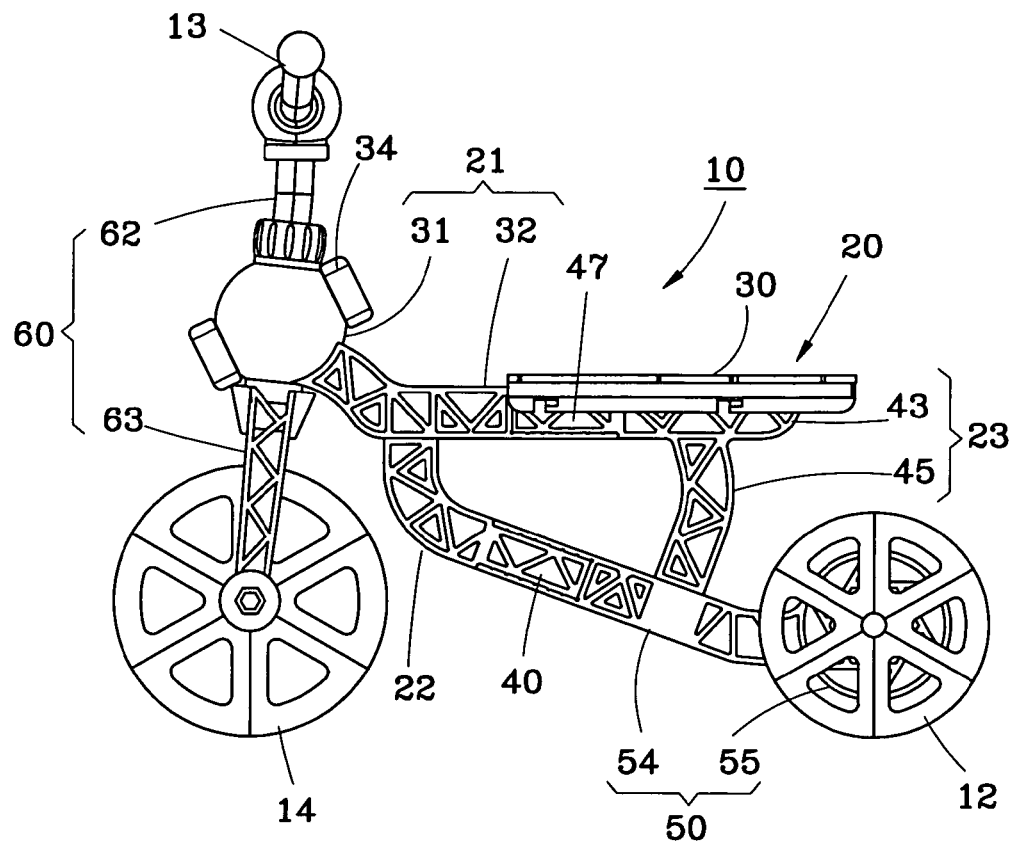
FIG. 4 is a front view of the combination vehicle frame according to the present invention.
Figure 5:
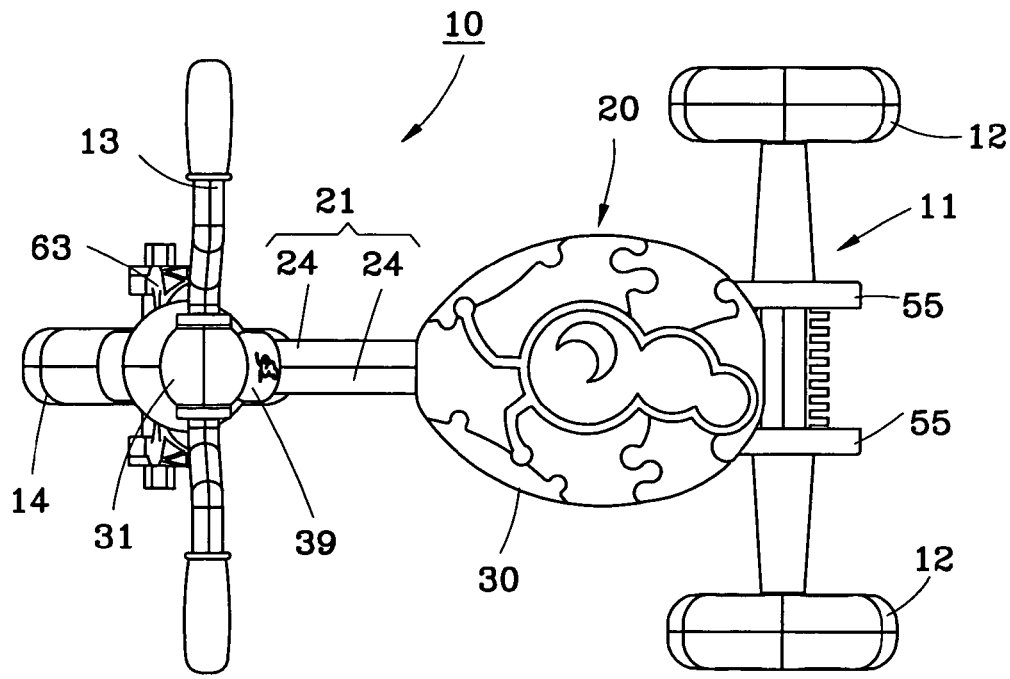
FIG. 5 is a top view of the combination vehicle frame according to the present invention.

Thereafter, the first locating hole 56 and second locating hole 57 of the rear wheel frame unit 50 are respectively coupled to the rear flat plug rod 40' of the second frame bar 22 and the plug rod 46' of the curved portion 45 of the third frame bar 23 to have the locating rods 58, 58' be respectively inserted into the through holes 42', 49' of the plug rods 40', 46' and the teeth 41', 47' be respectively maintained in engagement with the locating grooves 59, 59', and therefore the rear wheel frame unit 50 is detachably fastened to the base frame unit 20. Thereafter, the head tube 62 of the front wheel frame unit 60 is inserted through the first through hole 33 of the spherical head 31 and suspended in vertical, and the two caps 39 are respectively fastened to the two ends of the second through hole 34, keeping the front wheel 14 suspended below the spherical head 31. At this time, the support body 32 of the first frame bar 21 is kept in parallel to and spaced above the floor at a distance, and the seat 30 is supported on the base frame unit 10 above the elevation of the rear wheels 12. Therefore, as shown in FIGS. 4 and 5, the front wheel frame unit 60, the base frame unit 20 and the rear wheel frame unit 50 are joined together, forming a tricycle frame.

Figure 6:
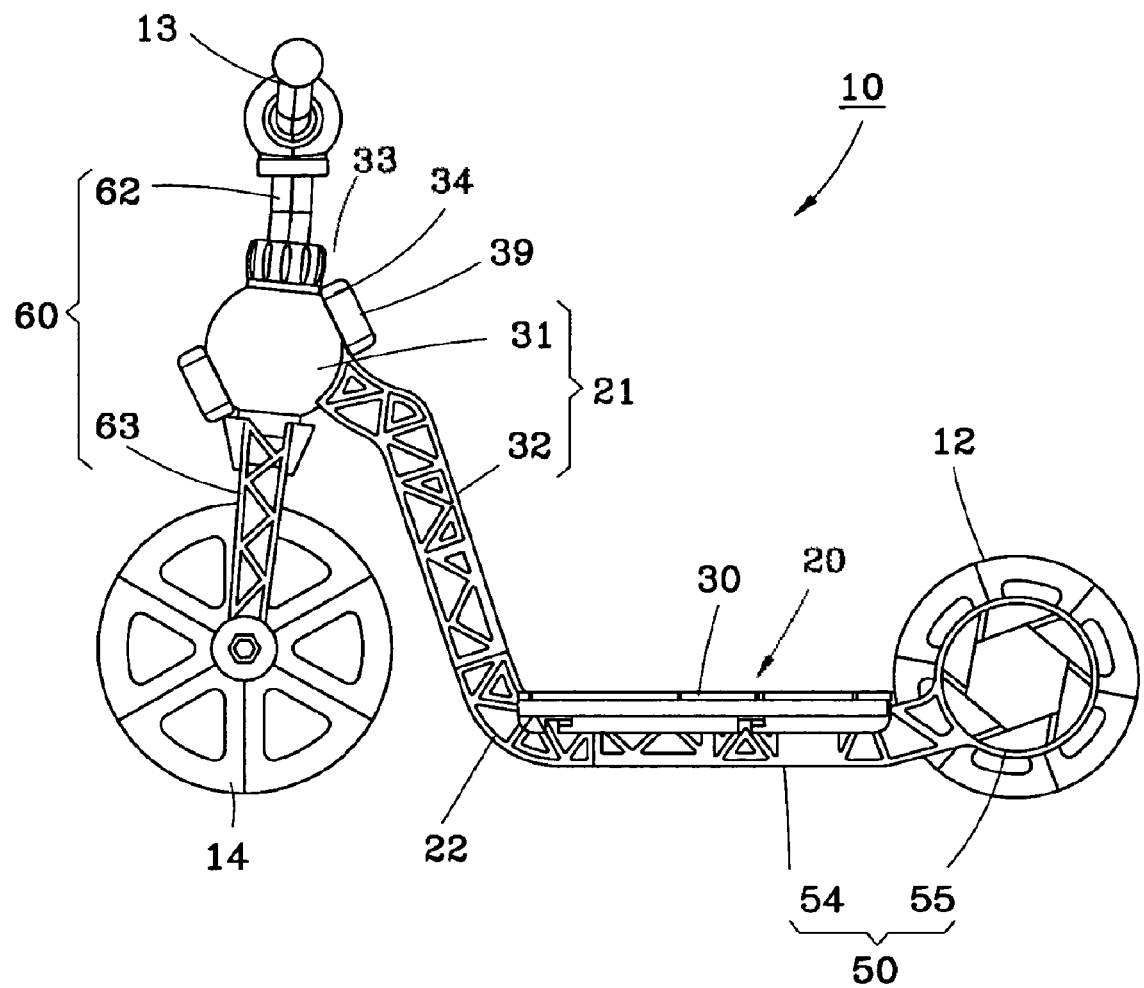
FIG. 6 is a side view of an alternate form of the present invention, showing the combination vehicle frame is assembled as a kick scooter.

FIG. 6 shows an alternate form of the present invention. According to this embodiment, the combination vehicle frame 10 is made in the form of a kick scooter, comprising a base frame unit 20, a front wheel frame unit 60, and a rear wheel frame unit 50. As illustrated, the base frame unit 20 of the combination vehicle frame 10 is comprised of a first frame bar 21, a second frame bar 22, and a seat 30. The first frame bar 21 has a support body 32 and a spherical head 31 provided at the front side of the support body 32. The spherical head 31 has a first through hole 33 and a second through hole 34. The second frame bar 22 is connected to the rear side of the support body 32 of the first frame bar 21. The rear wheel frame unit 50 has a front extension portion 54 horizontally forwardly extending from the front side thereof and connected to the second frame bar 22, and two rear coupling rings 55 arranged in parallel at the rear side thereof and coupled to a rear wheel 12 at two sides. The seat 30 is coupled to the front extension portion 54 of the rear wheel frame unit 50 at the top side. The front wheel frame unit 60 is inserted through the first through hole 33 of the spherical head 31. Two caps 39 are fastened to the two ends of the second through hole 34. The front wheel frame unit 60 supports a front wheel 14 below the spherical head 31. The front wheel 14 and the rear wheel 12 support the combination vehicle frame 10 on the floor. The second through hole 34 extends in vertical direction perpendicular to the floor. The support body 32 extends obliquely downwardly from the spherical head 31 toward the floor.

Although particular embodiments of the present invention have been described in detail for purposes of illustration, various modifications and enhancements may be made without departing from the spirit and scope of the invention. For example, the spherical head and support body of the first frame bar may can be independent members detachably fastened together; the seat may be formed integral with one frame bar of the base frame unit. Accordingly, the invention is not to be limited except as by the appended claims.

What is claimed is:
1. A combination vehicle frame comprising:
  a base frame unit formed of a plurality of frame bars detachably connected to one another, one of said frame bars being provided with a head having a first through hole and a second through hole intersecting said first through hole;
  a rear wheel frame unit detachably connected to said base frame unit; and
  a front wheel frame unit selectively inserted through one of said first through hole or said second through hole of said head;
  wherein said frame bars comprise a first frame bar and a second frame bar, said first frame bar comprising at least one locating hole and a plurality of locating grooves inside said at lest one locating hole, said second frame bar comprising at least one plug rod respectively inserted into the at least one locating hole of said first frame bar and a plurality of teeth arranged at said at least one plug rod for engaging the locating grooves of said first frame bar.

2. The combination vehicle frame as claimed in claim 1, wherein said first frame bar further comprises at least one locating rod respectively disposed in each said locating hole; said second frame bar comprises at least one through hole cut through each said plug rod for receiving the at least one locating rod in each said locating hole of said first frame bar.

3. The combination vehicle frame as claimed in claim 1, wherein said frame bars of said base frame unit each are comprised of two symmetrical half shells abutted against each other, said two symmetrical half shells each comprising a plurality of plug rods and a plurality of plug holes, the plug rods of one of said two symmetrical half shells being respectively fastened to the plug holes of the other of said two symmetrical half shells.

4. The combination vehicle frame as claimed in claim 1, wherein said frame bars comprise a first frame bar, a second frame bar, and a third frame bar, said first frame bar having said head at a front side thereof, said second frame bar having a front side connected to said first frame bar and a rear side connected to said rear wheel frame unit, said third frame bar being connected between said first frame bar and said rear wheel frame unit to support said first frame bar above said second frame bar.

5. The combination vehicle frame as claimed in claim 1, wherein said frame bars comprise a first frame bar and a second frame bar, said first frame bar having a front side, a rear side, and said head at the front side thereof, said second frame bar having a front side connected to the rear side of said first frame bar and a rear side connected to said rear wheel frame unit; said rear wheel frame unit has a front extension portion connected to the rear side of said second frame bar and kept close and in parallel to the floor.

6. The combination vehicle frame as claimed in claim 1, further comprising a seat provided at a top side of said base frame unit for carrying a person.

7. The combination vehicle frame as claimed in claim 6, wherein said seat is detachably coupled to said base frame unit.

8. The combination vehicle frame as claimed in claim 6, wherein said seat is formed integral with a part of said base frame unit.

9. The combination vehicle frame as claimed in claim 1, wherein said base frame unit further comprises two caps for selectively closing two distal ends of one of said first through hole and said second through hole of said head.

10. A combination vehicle frame comprising:
  a head having a first through hole and a second through hole intersecting said first through hole;

a base frame unit having a plurality of frame bars detachably connected to one another, one of said frame bars being connected to said head;

a rear wheel frame unit detachably connected to said base frame unit; and a front wheel frame unit selectively inserted through one of said first through hole or said second through hole of said head;

wherein said frame bars comprise a first frame bar and a second frame bar, said first frame bar comprising at least one locating hole and a plurality of locating grooves inside said at least one locating hole, said second frame bar comprising at least one plug rod respectively inserted into the at least one locating hole of said first frame bar and a plurality of teeth arranged at said at least one plug rod for engaging the locating grooves of said first frame bar.

11. The combination vehicle frame as claimed in claim 10, wherein said first frame bar further comprises at least one locating rod respectively disposed in each said locating hole; said second frame bar comprises at least one through hole cut through each said plug rod for receiving the at least one locating rod in each said locating hole of said first frame bar.

12. The combination vehicle frame as claimed in claim 10, wherein said frame bars of said base frame unit each are comprised of two symmetrical half shells abutted against each other, said two symmetrical half shells each comprising a plurality of plug rods and a plurality of plug holes, the plug rods of one of said two symmetrical half shells being respectively fastened to the plug holes of the other of said two symmetrical half shells.

13. The combination vehicle frame as claimed in claim 10, wherein said frame bars comprise a first frame bar, a second frame bar, and a third frame bar, said first frame bar having a front side connected to said head, said second frame bar having a front side connected to said first frame bar and a rear side connected to said rear wheel frame unit, said third frame bar being connected between said first frame bar and said rear wheel frame unit to support said first frame bar above said second frame bar.

14. The combination vehicle frame as claimed in claim 10, wherein said frame bars comprise a first frame bar and a second frame bar, said first frame bar having a front side connected to said head, and a rear side, said second frame bar having a front side connected to the rear side of said first frame bar and a rear side connected to said rear wheel frame unit; said rear wheel frame unit has a front extension portion connected to the rear side of said second frame bar and kept close and in parallel to the floor.

15. The combination vehicle frame as claimed in claim 10, further comprising a seat provided at a top side of said base frame unit for carrying a person.

16. The combination vehicle frame as claimed in claim 15, wherein said seat is detachably coupled to said base frame unit.

17. The combination vehicle frame as claimed in claim 15, wherein said seat is formed integral with a part of said base frame unit.

18. The combination vehicle frame as claimed in claim 10, wherein said base frame unit further comprises two caps for selectively closing two distal ends of one of said first through hole and said second through hole of said head.

* * * * *